United States Patent
Tsutsumizaki et al.

(10) Patent No.: US 8,336,514 B2
(45) Date of Patent: Dec. 25, 2012

(54) INTERNAL COMBUSTION ENGINE INCLUDING PLASMA GENERATING DEVICE

(75) Inventors: Takashi Tsutsumizaki, Saitama (JP); Tomomi Ishikawa, Saitama (JP); Hitoshi Okabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 902 days.

(21) Appl. No.: 12/235,382

(22) Filed: Sep. 22, 2008

(65) Prior Publication Data

US 2009/0078228 A1   Mar. 26, 2009

(30) Foreign Application Priority Data

Sep. 25, 2007   (JP) ................................. 2007-246866
Sep. 25, 2007   (JP) ................................. 2007-246867

(51) Int. Cl.
*F02B 1/12*   (2006.01)
*F02B 3/06*   (2006.01)
*F02B 9/00*   (2006.01)
*F02B 19/00*   (2006.01)
*F02B 23/00*   (2006.01)
*F02P 23/00*   (2006.01)
*F02M 27/00*   (2006.01)

(52) U.S. Cl. ............... 123/143 A; 123/143 B; 123/539; 123/585

(58) Field of Classification Search .............. 123/143 A, 123/539, 143 B, 198 A, 585, 590
See application file for complete search history.

(56) References Cited

U.S. PATENT DOCUMENTS

| | | | | |
|---|---|---|---|---|
| 4,308,844 A * | 1/1982 | Persinger | ...................... | 123/539 |
| 6,463,917 B1* | 10/2002 | Silver | ............................ | 123/536 |
| 7,341,049 B2* | 3/2008 | Clack | ............................ | 123/539 |
| 2004/0065306 A1* | 4/2004 | Parsa | ............................ | 123/539 |
| 2006/0037567 A1* | 2/2006 | Thomas | ....................... | 123/56.7 |
| 2006/0096573 A1* | 5/2006 | Jonson | ......................... | 123/300 |
| 2007/0137624 A1* | 6/2007 | Lee | ............................... | 123/539 |

FOREIGN PATENT DOCUMENTS

| | | |
|---|---|---|
| CN | 1433251 A | 7/2003 |
| JP | 2004-340048 A | 12/2004 |
| JP | 2006-161760 A | 6/2006 |
| JP | 2006-316777 A | 11/2006 |

* cited by examiner

*Primary Examiner* — Stephen K Cronin
*Assistant Examiner* — Sizo Vilakazi
(74) *Attorney, Agent, or Firm* — Birch, Stewart, Kolasch & Birch, LLP

(57) ABSTRACT

A plasma generating device for an internal combustion engine sets the generating-atmosphere pressure for generating plasma to the intake pressure, thereby achieving a reduction in the size, weight, and energy consumption of the plasma generating device and an improvement in combustibility. An internal combustion engine includes a throttle valve arranged in an intake passage having an intake opening that opens to a combustion chamber. An intake valve opens and closes the intake opening. A plasma generating device includes a plasma generator having a generating chamber for converting intake air into a plasma state to generate plasma. The plasma generating device supplies plasma to a downstream passage of the intake passage between the throttle valve and the intake valve. A gas control valve operates in conjunction with the throttle valve, and is arranged in an introduction passage between a clean chamber of the air cleaner chamber and a generating chamber.

18 Claims, 5 Drawing Sheets

INTERNAL COMBUSTION ENGINE INCLUDING PLASMA GENERATING DEVICE

CROSS-REFERENCE TO RELATED APPLICATIONS

The present application claims priority under 35 USC 119 to Japanese Patent Application No. 2007-246866 filed on Sep. 25, 2007 and Japanese Patent Application No. 2007-246867 filed on Sep. 25, 2007 the entire contents of which are hereby incorporated by reference.

BACKGROUND OF THE INVENTION

1. Field of the Invention

The present invention relates to an internal combustion engine including a plasma generating device that generates plasma.

2. Description of Background Art

An internal combustion engine is known which includes a plasma generating device that converts plasma-generating gas into a plasma state by electrical discharge to generate plasma containing radicals, the plasma generating device injects plasma toward a combustion chamber from its distal end portion facing the combustion chamber. See, for example, JP-A No. 2006-316777 (FIG. 11).

It is known that when generating plasma by a plasma generating device, the lower the pressure within a generating chamber (hereinafter; referred to as "generating-atmosphere pressure") where plasma is generated in the plasma generating device, the easier it is to generate plasma. Therefore, in the case of a plasma generating device used in an internal combustion engine, plasma generation efficiency can be improved if plasma can be generated at a pressure equivalent to a compression pressure within the combustion chamber near the compression top dead center corresponding to the timing of the air-fuel mixture ignition or the timing immediately before ignition, or at a generating-atmosphere pressure lower than a generating-atmosphere pressure equal to or higher than the compression pressure.

With an improvement in plasma generation efficiency, an improvement in combustibility due to radicals contained in plasma can be anticipated. Furthermore it is possible to reduce the size, weight, and power consumption of the plasma generating device.

Further, an internal combustion engine is known which includes a plasma generating device that uses exhaust gas as the plasma-generating gas wherein generated plasma is supplied to an intake passage. See, for example, JP-A No. 2004-340048.

Since plasma contains radicals, adding plasma to intake air or an air-fuel mixture improves combustibility. However, the intake rate of intake air to be sucked into the combustion chamber in accordance with a required load on the internal combustion engine varies greatly depending on the operational state of the internal combustion engine. Thus, if the amount of generated plasma is not sufficient relative to the intake rate, it is difficult to fully exploit the combustibility improving effect due to plasma across a wide operating range of the internal combustion engine. Further, there are also cases where the amount of plasma becomes excessive relative to the intake rate.

Accordingly, to control the amount of generated plasma, it may be possible to make the gas rate of the plasma-generating gas introduced into the plasma generating device constant for controlling the discharge voltage for generating electrical discharge for converting the plasma-generating gas into a plasma state. In this case, however, the presence of the plasma-generating gas that is not converted into plasma may make it difficult to adjust the mixing ratio (i.e., the air-fuel ratio) in an air-fuel mixture between fuel and air sucked into the combustion chamber to ensure the uniformity of the mixing.

In a case where an intake pressure in the intake passage is used to introduce plasma-generating gas to the reaction chamber, since the opening of the throttle valve is small during low load operation of the internal combustion engine, the intake pressure downstream of the throttle valve becomes low (the negative pressure becomes large), so the gas rate of plasma-generating gas tends to become excessive. On the other hand, since the opening of the throttle valve becomes large during high load operation of the internal combustion engine, and the intake pressure downstream of the throttle valve becomes high (the negative pressure becomes small), the gas rate of plasma-generating gas becomes insufficient, so the combustibility improving effect due to plasma may not be fully attained.

SUMMARY AND OBJECTS OF THE INVENTION

The present invention has been made in view of the above-mentioned circumstances. An object of an embodiment of the present invention is to improve plasma generation efficiency in an internal combustion engine including a plasma generating device by setting the generating-atmosphere pressure for generating plasma to the intake pressure, thereby achieving a reduction in the size, weight, and energy consumption of the plasma generating device, and an improvement in combustibility due to plasma.

According to an embodiment of the present invention, an increase the degree of freedom is achieved in terms of the position where plasma is supplied in the intake passage, and to simplify the structure of the plasma generating device.

According to an embodiment of the present invention, a compact arrangement is achieved of the plasma generating device.

According to an embodiment of the present invention, an internal combustion engine includes an intake device having a throttle valve arranged in an intake passage having an intake opening that opens to a combustion chamber, an intake valve that opens and closes the intake opening, and a plasma generating device having a generating chamber for converting plasma-generating gas into a plasma state to generate plasma, in which the generating chamber communicates with the intake passage, and the plasma generating device supplies plasma to a passage portion of the intake passage between the throttle valve and the intake valve.

According to an embodiment of the present invention, the plasma generating device includes a plasma generator that forms the generating chamber, and a supply pipe that is connected to the plasma generator to introduce plasma to the passage portion and communicates the passage portion with the generating chamber at all times.

According to an embodiment of the present invention, the plasma-generating gas is intake air that flows in the intake passage, and the plasma generator and the supply pipe are arranged along the intake passage.

According to an embodiment of the present invention, the generating chamber where plasma is generated in the plasma generating device communicates with an intake passage where the intake pressure becomes a pressure lower than the compression pressure within the combustion chamber near the compression top dead center, so the generating-atmosphere pressure becomes substantially equal to the intake pressure. As a result, as compared with a case where the generating-atmosphere pressure is the above-mentioned compression pressure, the efficiency of plasma generation can be improved, thus making it possible to reduce the size and weight of the plasma generating device. Furthermore, due to the low generating-atmosphere pressure, it is possible to reduce the consumption of energy for generating plasma.

Further, since intake air is heated by plasma and raised in temperature, and also due to radicals contained in plasma, the combustibility of the air-fuel mixture within the combustion chamber is enhanced, thereby achieving enhanced engine output and improved fuel efficiency.

According to an embodiment of the present invention, since plasma generated by the plasma generator is supplied through the supply pipe, the arrangement of the supply pipe or the connecting portion of the supply pipe to the intake passage can be easily changed, thereby increasing the degree of freedom in terms of the supply portion of plasma in the plasma generator and the passage portion of the intake passage.

Further, since an intake pressure downstream of the throttle valve is transmitted to the generating chamber through the supply pipe, there is no need to provide a dedicated passage or conduit for bringing the generating-atmosphere pressure into the intake pressure, thereby simplifying the structure of the plasma generating device.

According to an embodiment of the present invention, since the plasma-generating air is intake air, and the plasma generator and the supply pipe are arranged along the intake passage, the plasma generator and the supply pipe can be arranged side by side with the intake device, thus allowing a compact arrangement of the plasma generating device.

The present invention has been made in view of the above-mentioned circumstances. Accordingly, an object of an embodiment of the present invention is to control the flow rate of plasma-generating gas introduced into a generating chamber where plasma is generated in an internal combustion engine including a plasma generating device to thereby enhance the combustibility for improving the effect due to plasma.

According to an embodiment of the present invention, the gas control valve is operated in conjunction with the intake control valve to thereby suppress variations in air-fuel ratio resulting from the gas rate of plasma-generating air.

Furthermore, according to an embodiment of the present invention, the structure of the plasma generating device is simplified and the arrangement of an intake device and plasma generating device is made more compact.

According to an embodiment of the present invention, an internal combustion engine includes an intake device including an intake control valve that controls an intake rate of intake air sucked into a combustion chamber through an intake passage, and a plasma generating device having a generating chamber for converting plasma-generating gas into a plasma state to generate plasma, in which the plasma generating device includes a gas flow rate controlling means for controlling a gas flow rate of the plasma-generating gas in accordance with a required load, and supplies plasma to the intake passage.

According to an embodiment of the present invention, the plasma-generating gas is plasma-generating air that is air outside of the internal combustion engine or the intake air upstream of the intake control valve, the gas flow rate controlling means is formed by a gas control valve, and the gas control valve operates in conjunction with the intake control valve.

According to an embodiment of the present invention, the intake device includes an air cleaner that forms an air cleaner chamber constituting the intake passage, the gas control valve is arranged in an introduction passage that communicates between the air cleaner chamber and the generating chamber, and the generating chamber communicates with a passage portion of the intake passage downstream of the intake control valve to supply the plasma to the passage portion.

According to an embodiment of the present invention, the intake control valve and the gas control valve have a common valve shaft.

According to an embodiment of the present invention, the generating amount of plasma to be generated can be controlled by the gas flow rate controlling means controlling the gas rate of plasma-generating air introduced into the generating chamber so as to increase or decrease in accordance with a required load on the internal combustion engine. Thus, the gas rate of plasma-generating gas relative to the required load can be set appropriately across a wide operating range of the internal combustion engine in which the required load varies. As a result, variations in the air-fuel ratio and a decrease in the uniformity of the mixing of intake air and fuel resulting from the presence of plasma-generating air not converted into plasma can be suppressed while setting the amount of plasma supplied to the intake passage appropriate in accordance with the required load. Thus, it is possible to enhance the combustibility improving effect due to plasma.

According to an embodiment of the present invention, the gas control valve operates in conjunction with the intake control valve to control the gas rate of plasma-generating air (i.e., the flow rate of air), thereby suppressing variations in air-fuel ratio resulting from the gas rate of plasma-generating air.

According to an embodiment of the present invention, air within the clean chamber of the air cleaner of the intake device is introduced to the generating chamber through the introduction passage after having its flow rate controlled by the gas control valve. As a result, plasma-generating air can be taken in by using the air cleaner of the intake device, so the structure of the plasma generating device can be simplified. Moreover, the plasma generating device can be arranged in close proximity to the intake device, thus allowing a compact arrangement of the intake device and plasma generating device.

Since plasma-generating air is taken in from within the air cleaner, even when generated plasma flows back into the introduction passage, after the backflowing plasma flows into the air cleaner chamber through the introduction passage, the backflowing plasma flows toward the downstream side through the intake passage together with intake air and is sucked into the combustion chamber. As a result, by using the air cleaner equipped to the intake device, leakage of backflowing plasma to the outside of the internal combustion engine can be prevented by means of a simple structure.

According to an embodiment of the present invention, since the intake control valve and the gas control valve have a common valve shaft, the valve shaft of the intake control valve can be used as the valve shaft of the gas control valve, so the structure of the plasma generating device can be simplified. Furthermore, the plasma generating device can be arranged in close proximity to the intake device, thus allowing compact arrangement of the intake device and plasma generating device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, an embodiment of the present invention will be described with reference to FIGS. 1 to 5.

Figure 1:
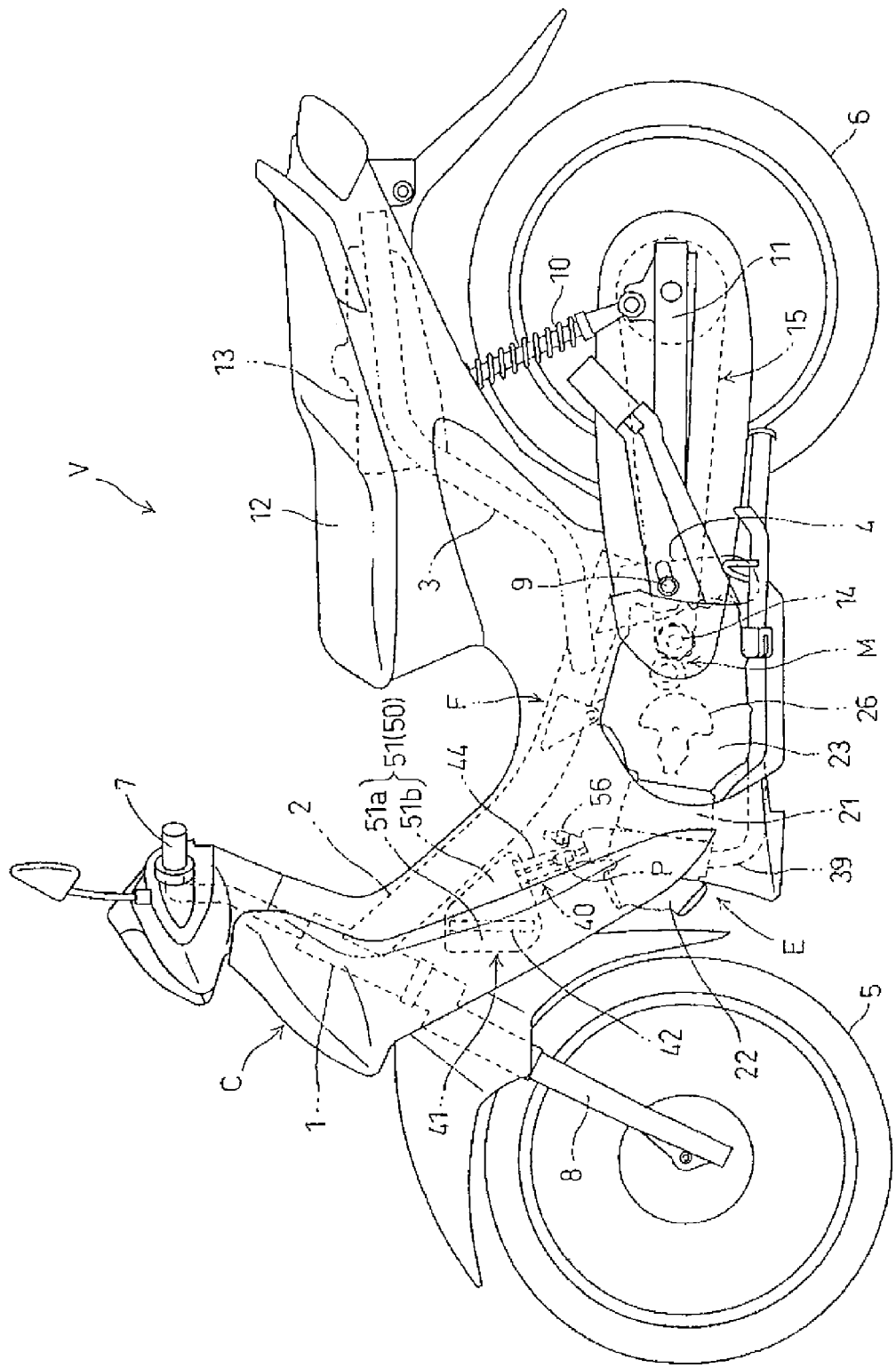
FIG. 1 is a main-portion left side view of a motorcycle having mounted therein an internal combustion engine to which the present invention is applied.

Referring to FIG. 1, an internal combustion engine E is an air-cooled single-cylinder 4-stroke internal combustion engine that includes a plasma generating device P to according to an embodiment of the present invention. The internal combustion engine E is mounted horizontally in a motorcycle V as a vehicle with a crankshaft 26 oriented along the vehicle width direction. The internal combustion engine E and a transmission M coupled to the internal combustion engine E constitute a power unit that rotationally drives a rear wheel 6 as a drive wheel by means of power generated by the internal combustion engine E.

The motorcycle V includes a body having a body frame F and a body cover C that covers the body frame F, the power unit supported on the body frame F, and a chain-type transmission mechanism 15 as a final reduction gear mechanism that reduces the speed of power from the power unit before transmitting it to the rear wheel 6.

The body frame F includes a head pipe 1 as its front end portion, a main frame 2 that extends obliquely downwardly to the rear from the head pipe 1, a pair of left and right rear frames 3 that extend obliquely upwardly to the rear from a rear portion of the main frame 2, and a pivot plate 4 attached to a rear portion of the main frame 2.

A front fork 8 is steerably supported on the head pipe 1. The front fork 8 has a front wheel 5 journalled to a lower end portion and also has a handlebar 7 attached to an upper end portion. A front end portion of a swing arm 11 is swingably supported on a pivot shaft 9 supported on the pivot plate 4. The swing arm 11 has the rear wheel 6 journalled to a rear end portion and is supported on the left rear frame 3 via a rear shock absorber 10. On a rear portion of the rear frame 3, a fuel tank 13 is supported directly below a seat 12.

It should be noted that in this embodiment, directions such as upper and lower, front and rear, and left and right are defined with reference to the motorcycle V.

The transmission M is formed by a gear type transmission to the input shaft of which the power of the internal combustion engine E is inputted via the crankshaft 26 and a clutch. The transmission M is arranged within a transmission case formed integrally with a crankcase 23 of the internal combustion engine E. Power from an output shaft 14 of the transmission M is transmitted to the rear wheel 6 via the transmission mechanism 15.

Figure 2:
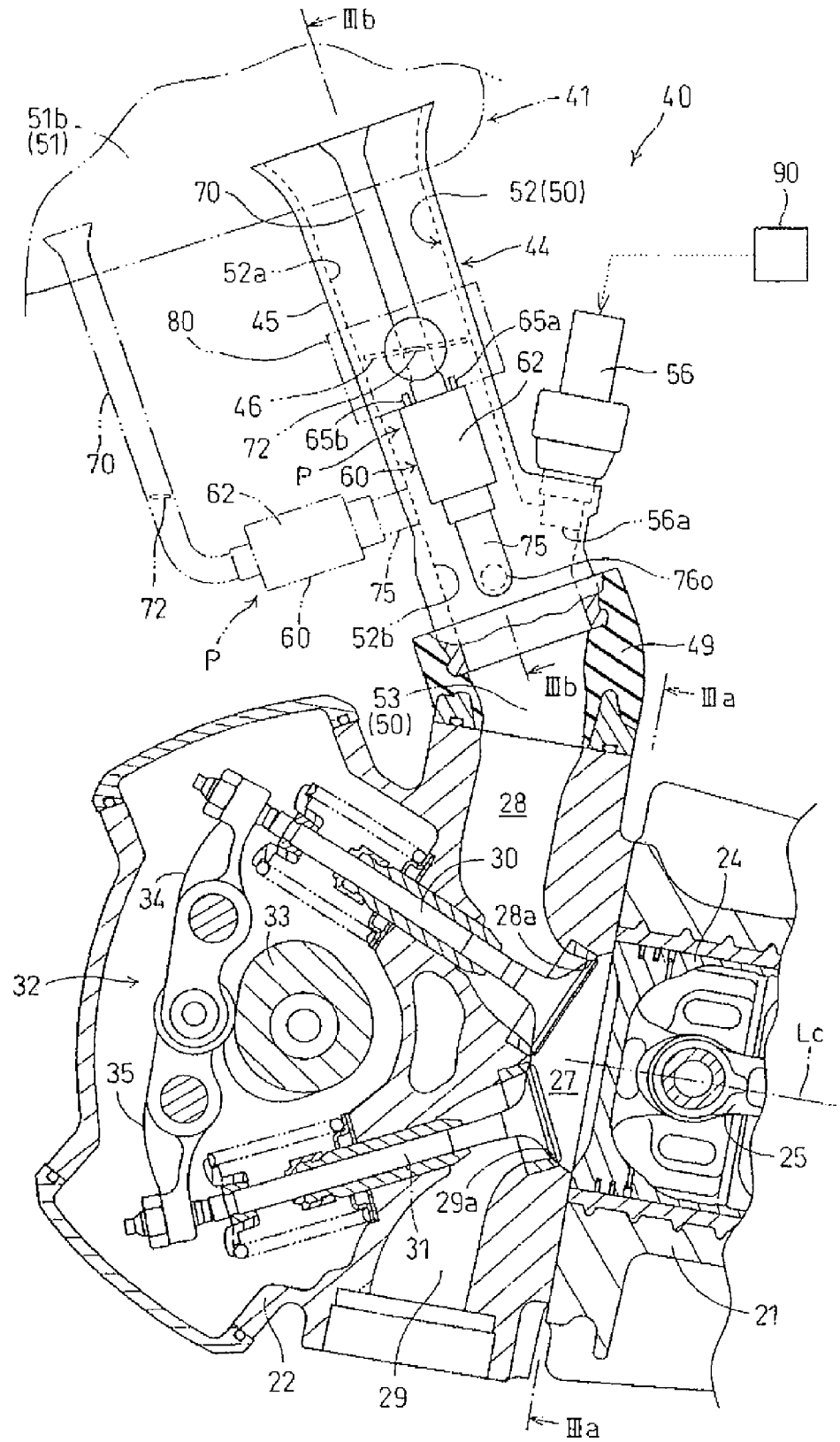
FIG. 2 is an enlarged main-portion view, partly in section, of the internal combustion engine in FIG. 1.

As illustrated in FIG. 2, the internal combustion engine E includes an engine body having a cylinder 21 that is greatly tilted forward in such a way that its cylinder axis Lc is oriented slightly upwardly and obliquely with respect to the horizontal plane toward the front from the crankshaft 26. A cylinder head 22 is joined to an end portion of the cylinder 21 with the crankcase 23 joined to an end portion of the cylinder 21 opposite to the cylinder head 22 with respect to the cylinder axis direction.

A piston 24 is fitted with the cylinder 21, which is arranged in the body with its cylinder axis Lc oriented substantially horizontally, in a manner that allows reciprocating motion. The piston 24 is coupled via a connecting rod 25 to the crankshaft 26 that is rotatably supported on the crankcase 23.

Figure 3:
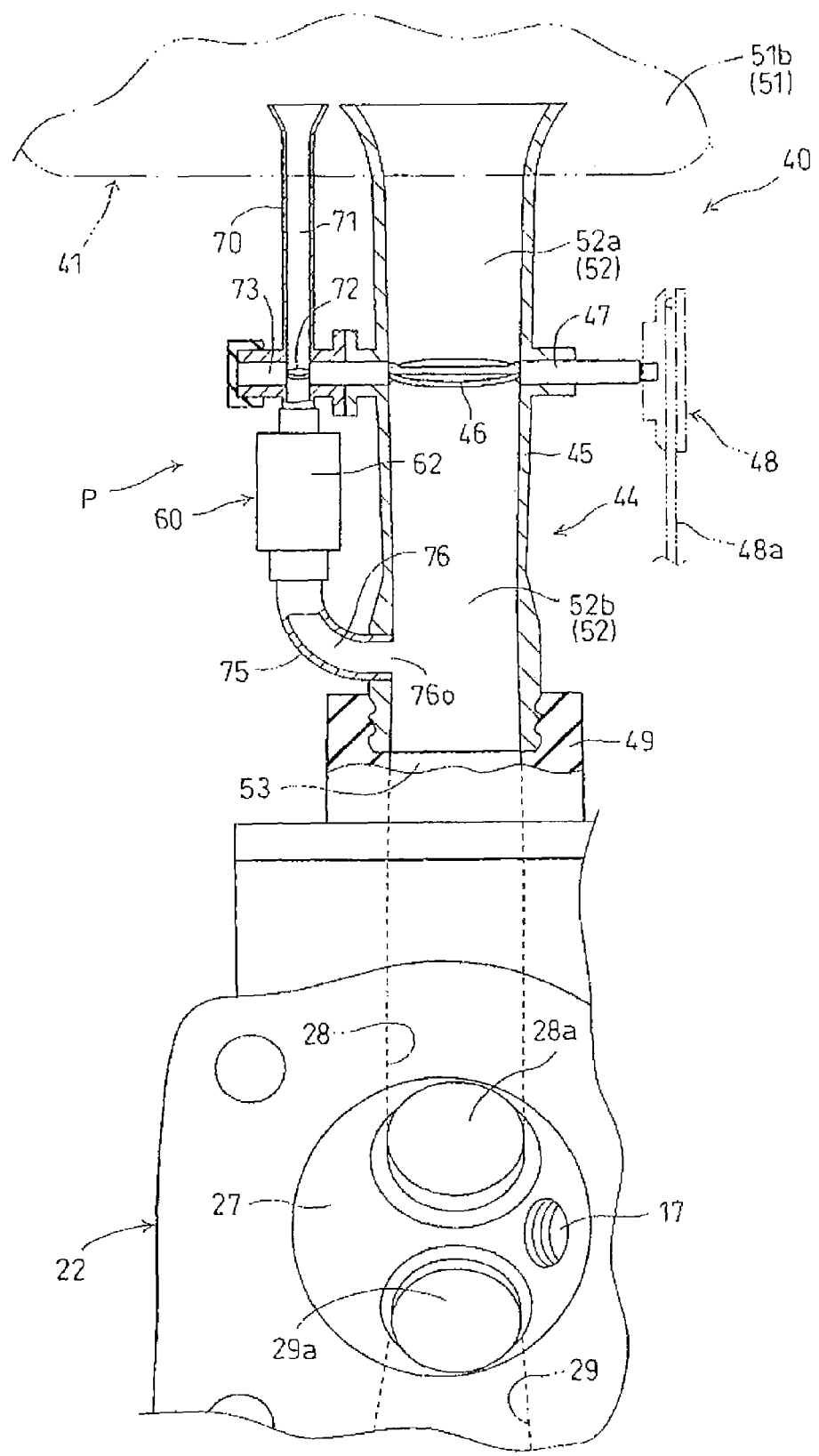
FIG. 3 is a main-portion view as seen from arrow IIIa-IIIa and a main-portion sectional view taken along line IIIb-IIIb in FIG. 2.

As illustrated in FIGS. 2, 3, the cylinder head 22 includes a combustion chamber 27 that is opposed to the piston 24 with respect to the cylinder axis direction, an intake port 28 having an intake opening 28a that opens to the combustion chamber 27, an exhaust port 29 having an exhaust opening 29a that opens to the combustion chamber 27, and an intake valve 30 and an exhaust valve 31 that open and close the intake opening 28a and the exhaust opening 29a, respectively.

The intake valve 30 and the exhaust valve 31 are driven by an overhead camshaft type valve gear 32 so as to open and close in synchronization with rotation of the crankshaft 26. The valve gear 32 includes a camshaft 33 rotatably supported on the cylinder head 22, and rocker arms 34 and 35 driven by the camshaft 33.

As illustrated in FIG. 1, the internal combustion engine E includes an intake device 40 that forms an air passage 50 for introducing air sucked in from the outside of the internal combustion engine E (hereinafter, referred to as "intake air") to the combustion chamber 27 via the intake port 28, a fuel injection valve 56 as air-fuel mixture forming means for forming an air-fuel mixture by supplying fuel to the intake air introduced by the air passage 50, and an exhaust device that forms an exhaust passage for introducing combustion gas, which is produced by burning the air-fuel mixture within the combustion chamber 27, to the outside of the internal combustion engine E as exhaust gas from the combustion chamber 27 via the exhaust port 29.

The intake device 40 includes an air cleaner 41 arranged in a front portion of the body that takes in outside air, a throttle device 44 including a throttle body 45 connected to the air cleaner 41, and an intake pipe 49 as an intake pipe device connected to the throttle device 44 and the cylinder head 22. The intake pipe 49 has a portion that is formed of an electrically and thermally insulating material, which in this example is rubber. It should be noted that the throttle body 45 may be connected to the air cleaner 41 via a duct that is separate from the throttle body 45.

The upstream and downstream directions are defined with respect to the flow of intake air.

The air cleaner 41, which is covered by the body cover C from the left, right, and above and attached to the main frame 2, is arranged below the main frame 2, and forms an air cleaner chamber 51 in which a cleaner element 42 as a filtering member is accommodated. The air cleaner chamber 51 is divided into a dust chamber 51a on the upstream side and a clean chamber 51b on the downstream side by the cleaner element 42. The upstream end of the throttle body 45 opens to the clean chamber 51b.

As illustrated in FIGS. 2, 3, the throttle device 44 includes the throttle body 45 that is a duct forming the air passage 52 through which intake air from the air cleaner chamber 51 flows, and a throttle valve 46 as an intake control valve arranged in the air passage 52. The throttle valve 46, which is formed by a butterfly valve, is operated by a throttle operating mechanism 48 as a valve operating mechanism. More specifically, the throttle valve 46 is operated through its valve shaft 47 by the throttle operating mechanism 48 having an operating cable 48a operated by the rider, so that its opening is varied within a range between a close position where the opening becomes the smallest and an open position where the opening becomes the largest. Thus, an intake rate Ma is controlled (see FIG. 5), which is the flow rate of intake air sucked into the combustion chamber 27 through the air passage 52. The air passage 52 includes an upstream passage 52a upstream of the throttle valve 46, and a downstream passage 52b downstream of the throttle valve 46, with the throttle valve 46 located therebetween. In the downstream passage 52b, an intake pressure according to the opening of the throttle valve 46 is generated. The smaller the opening, the lower the generated intake pressure (that is, the larger the generated negative pressure).

A control device 90 controls the fuel injection valve 56, which is attached to the throttle body 45 and faces the downstream passage 52b at a position downstream of the throttle valve 46. A detection signal from operational state detecting means for detecting the engine's operational state such as the engine speed and engine load is inputted to the control device 90. The fuel injection valve 56 injects fuel into the downstream passage 52b toward the intake port 28 at an injection rate and injection timing set on the basis of the engine's operational state.

An air-fuel mixture is formed when intake air that has entered the air passage 52 from the air cleaner chamber 51 that has its flow rate controlled by the throttle valve 46 is mixed with fuel injected from the fuel injection valve 56. The air-fuel mixture passes through the air passage 52, an air passage 53 formed by the intake pipe 49, and the intake port 28 to enter the combustion chamber 27 when the intake valve 30 is opened, and is then ignited for combustion by an ignition plug (not shown) that is inserted into an insertion hole 17 provided in the cylinder head 22 and faces the combustion chamber 27. Combustion gas generated by the combustion of the air-fuel mixture in the combustion chamber 27 drives the piston 24 before flowing out to the exhaust port 29 when the exhaust valve 31 is opened. The combustion gas further passes through the exhaust device including an exhaust pipe 39 (see FIG. 1) connected to the exhaust port 29, before being released to the outside of the internal combustion engine E.

An intake air passage (hereinafter, referred to as "intake passage") is formed by the air cleaner chamber 51 and the air passages 52, 53 that form the air passage 50 of the intake device 40, and the intake port 28.

Figure 4:
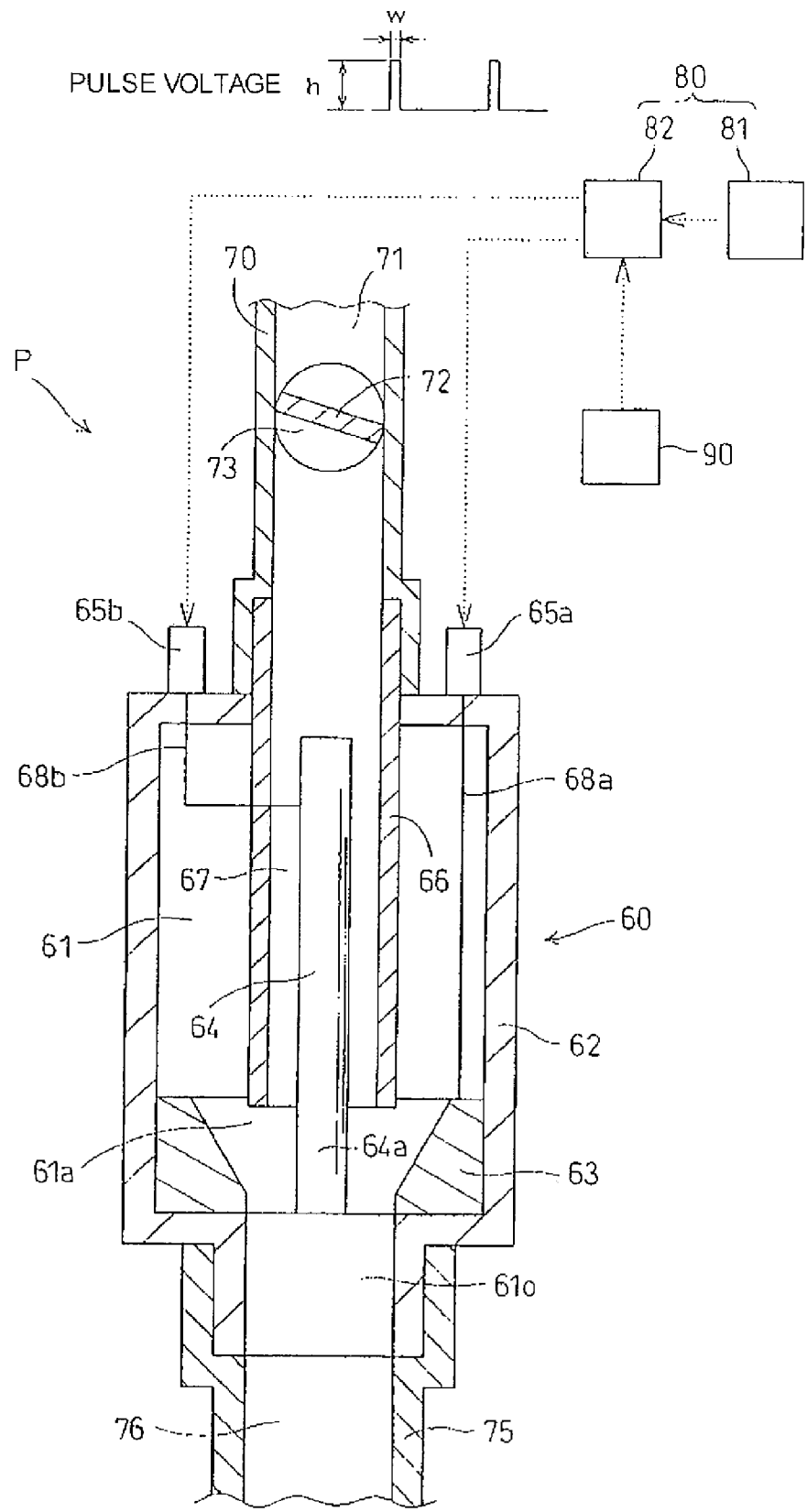
FIG. 4 is a main-portion sectional view of a plasma generating device in FIG. 2.

As illustrated in FIGS. 2 to 4, the internal combustion engine E includes a plasma generating device P (see also FIG. 1) that generates plasma by converting intake air that is air serving as plasma-generating gas (hereinafter, referred to as "plasma-generating air") into a plasma state. As is well known, plasma contains radicals (when air is plasma-generating gas, oxygen radicals or nitrogen radicals) which are high-temperature activated molecules, thus promoting combustion.

The plasma generating device P includes a plasma generator 60 having a generating chamber 61 where plasma is generated, an introduction pipe 70 forming an introduction passage 71 for introducing plasma-generating air to the generating chamber 61, a supply pipe 75 forming a supply passage 76 for supplying plasma to the intake passage, and a power supply device 80 as an energy source for generating plasma.

The plasma generator 60 having a tubular shape includes a tubular housing 62 having a cylindrical shape in this example which forms the generating chamber 61, an anode 63 and a cathode 64 that are arranged within the generating chamber 61, connection terminals 65a, 65b connected to the power supply device 80, and a guide pipe 66 that forms a guide passage 67 for introducing plasma-generating air from the introduction passage 71 to a discharge space 61a as a plasma generating space within the generating chamber 61. The housing 62 and the guide pipe 66 are each formed of an electrically and thermally insulating material.

The cathode 64 is a columnar electrode that is arranged within the guide passage 67 coaxially with the guide pipe 66 and includes an end portion 64a that projects from the downstream end of the guide passage 67. The anode 63 is an annular electrode surrounding the end portion 64a concentrically with the cathode 64, and forms the discharge space 61a that is tapered toward an outlet 61o of the generating chamber 61. The anode 63 and the cathode 64 are connected to the connection terminals 65a, 65b via electrical wires 68a, 68b as conductors, respectively. In the discharge space 61a that is a part of the generating chamber 61, arc discharge as an electrical discharge occurs between the anode 63 and the cathode 64 that are applied with voltage, so plasma-generating air within the generating chamber 61 is converted into a plasma state to generate plasma.

In this description, one of the anode 63 and the cathode 64 is a first electrode and the other electrode is a second electrode.

The introduction pipe 70 is connected to the air cleaner 41 on the upstream side, and is connected to the guide pipe 66 of the plasma generator 60 on the downstream side. The introduction passage 71 communicates the clean chamber 51b with the generating chamber 61 via the guide passage 67 that also serves as the inlet of the generating chamber 61, thus introducing intake air within the clean chamber 51b to the generating chamber 61 as plasma-generating air through the guide passage 67. Therefore, the plasma-generating air is the intake air upstream of the throttle valve 46.

In the introduction passage 71, there is arranged a gas control valve 72 that constitutes a gas rate controlling means for controlling a gas rate Mg (see FIG. 5), which represents the flow rate of plasma-generating air flowing into the generating chamber 61, in accordance with the required load on the internal combustion engine E. The gas control valve 72, which operates in conjunction with the throttle valve 46 to open and close the introduction passage 71, is opened and closed in synchronization with the opening and closing of the throttle valve 46 in such a way that the gas control valve 72 is opened when the throttle valve 46 is opened.

The gas control valve 72 and the throttle valve 46 have a common valve shaft formed by a single member. More specifically, the gas control valve 72 is a butterfly valve formed by partially cutting out a valve shaft 73 that constitutes a part of the valve shaft 47 of the throttle valve 46. The gas control valve 72 is operated to open and close by the throttle operating mechanism 48.

Figure 5:
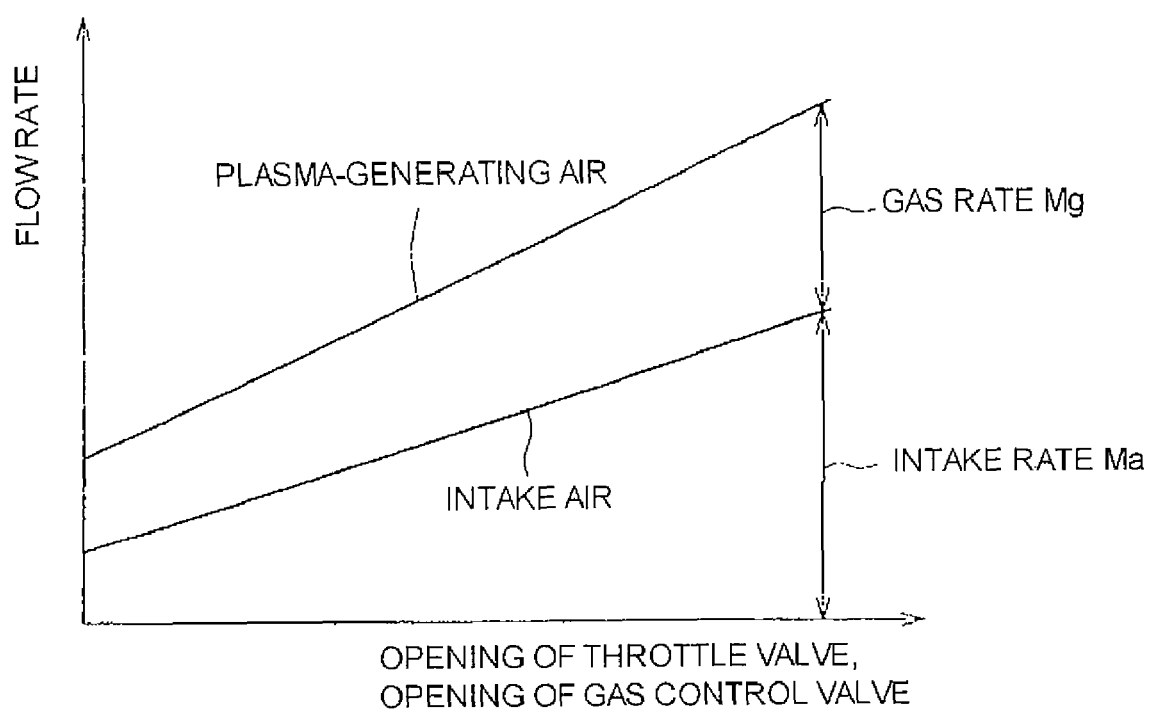
FIG. 5 is a graph showing the relationship between the opening of a throttle valve and the opening of a gas control valve, and the intake rate and the gas rate in the internal combustion engine in FIG. 1.

As illustrated in FIG. 5, the gas control valve 72 is controlled by the throttle operating mechanism 48 so as to increase the gas rate Mg of plasma-generating air when the required load on the internal combustion engine E, that is, the intake rate Ma of intake air increases. In this embodiment, the gas control valve 72 is controlled so as to increase the gas rate Mg when the intake rate Ma increases, across the entire range of the opening of the throttle valve 46.

At this time, the ratio of the gas rate Mg of plasma-generating air to the intake rate Ma is set in such a way that the gas rate Mg becomes larger as the opening of the throttle valve 46 becomes smaller, that is, as the engine load on the internal combustion engine E becomes smaller; and that the gas rate Mg becomes larger than the intake rate Ma in a low load operating range of the internal combustion engine E and the gas rate Mg becomes smaller than the intake rate Ma in a high load operating range of the internal combustion engine E.

A total flow rate as the sum of the intake rate Ma and the gas rate Mg represents the flow rate of air sucked into the combustion chamber 27. Air at this total flow rate provides an air-fuel mixture at a set air-fuel ratio set in advance so as to conform to the operational state of the internal combustion engine E.

The supply pipe 75 supplies plasma emitted from the outlet 61o to the downstream passage 52b that is a passage portion of the intake passage between the throttle valve 46 and the intake valve 30. The supply pipe 75 is connected to the housing 62 on the upstream side, and is connected to the throttle body 45 on the downstream side. The supply passage 76 communicates the generating chamber 61 with the downstream passage 52b through the outlet 61o to introduce plasma generated in the discharge space 61a to the downstream passage 52b. The plasma is sucked into the combustion chamber 27 together with the air-fuel mixture or intake air.

An exit 76o of the supply passage 76 is arranged downstream of a nozzle portion 56a of the fuel injection valve 56, and is located slightly upstream of a jet of fuel injected from the fuel injection valve 56 or inside the jet of fuel. Thus, the intake air in the downstream passage 52b and the fuel from the fuel injection valve 56 are heated by high-temperature plasma supplied from the supply pipe 75, thus facilitating the formation of an air-fuel mixture and also improving combustibility.

The supply passage 76 or the supply pipe 75 communicates the downstream passage 52b with the generating chamber 61 at all times. Therefore, the generating chamber 61 communicates with the intake passage at all times. Since the intake pressure in the downstream passage 52b is thus transmitted to the generating chamber 61 including the discharge space 61a through the supply passage 76 or the supply pipe 75, the generating-atmosphere pressure as the pressure in the generating chamber 61 becomes substantially equal to the intake pressure in the downstream passage 52b.

As shown in FIGS. 2 and 3) the introduction pipe 70, the housing 62, and the supply pipe 75 are arranged along the air passage 52 as an intake passage. The passage centerline of the introduction pipe 70 or introduction passage 71 and the center axis of the housing 62 are substantially parallel to the passage centerline of the air passage 52.

The power supply device 80 that applies voltage to the anode 63 and the cathode 64 includes a battery 81 as a power supply, and a power supply control device 82 that converts the voltage of the battery 81 into a pulse-like voltage (hereinafter, referred to as "pulse voltage"). The power supply control device 82 controls the frequency, pulse width w, pulse height h representing the magnitude of voltage, and the application timing and duration of a pulse voltage as a discharge voltage in accordance with the above-mentioned engine's operational state, on the basis of a signal from the control device 90.

When a voltage pulse at a predetermined frequency is applied to the anode 63 and the cathode 64, arc discharge at a predetermined frequency occurs between the anode 63 and the cathode 64, producing a pulse discharge current as a pulse-like current. By changing the pulse width w of the pulse voltage when the pulse height is set constant, the duty ratio of the pulse discharge current as a discharge current is controlled, so the temperature of plasma to be generated or the amount of radicals generated is controlled.

The duty ratio of a pulse discharge current refers to the ratio of the duration of time in which the pulse discharge current flows to one cycle of a pulse voltage.

The timing and duration at or for which a pulse voltage is applied to the anode 63 and the cathode 64 are set to be substantially the same as the fuel injection timing and fuel injection duration of the fuel injection valve 56.

Since the voltage applied to the anode 63 and the cathode 64 is a pulse voltage, as compared with a case where a constant voltage is applied at all times, power consumption as the energy consumed for generating plasma can be significantly reduced.

Further, the following information is found by experiment.

With an increase in duty ratio, the temperature of plasma rises, and the amount of radicals generated increases.

With an increase in pulse height h, the amount of radicals generated increases.

Thus, in addition to the control of the gas rate Mg of plasma-generating air, the pulse voltage or pulse discharge current may be controlled to control the amount of radicals generated.

Next, the operation and effect of the embodiment configured as described above will be described.

In the plasma generating device P provided with the generating chamber 61 for generating plasma, the generating chamber 61 communicates with the intake passage, and the plasma generating device P supplies plasma to the downstream passage 52b between the throttle valve 46 and the intake valve 30 in the intake passage. Since the generating chamber 61 thus communicates with an intake passage where the intake pressure becomes a pressure lower than the compression pressure within the combustion chamber 27 near the compression top dead center, the generating-atmosphere pressure becomes substantially equal to the intake pressure. As a result, as compared with a case where the generating-atmosphere pressure is the above-mentioned compression pressure, the efficiency of plasma generation can be improved, thus making it possible to reduce the size and weight of the plasma generating device P. Furthermore, due to the low generating-atmosphere pressure, it is possible to reduce the consumption of power for generating plasma.

Further, due to plasma, intake air and fuel supplied from the fuel injection valve 56 are heated and raised in temperature. Thus, the formation of an air-fuel mixture is facilitated. Therefore, and also due to radicals contained in plasma, the combustibility of the air-fuel mixture within the combustion chamber 27 is enhanced, thereby achieving enhanced engine output and improved fuel efficiency.

The plasma generating device P includes the plasma generator 60 provided with the generating chamber 61, and the supply pipe 75 that is connected to the plasma generator 60 to introduce plasma to the downstream passage 52b and also communicates the downstream passage 52b with the generating chamber 61 at all times. Since plasma generated by the plasma generator 60 is thus supplied through the supply pipe 75, the arrangement of the supply pipe 75 or the connecting portion of the supply pipe 75 to the intake passage can be easily changed, thereby increasing the degree of freedom in terms of the supply portion of plasma in the plasma generator 60 and the downstream passage 52b of the intake passage.

Further, since an intake pressure downstream of the throttle valve 46 is transmitted to the generating chamber 61 through the supply pipe 75, there is no need to provide a dedicated passage or conduit for bringing the generating-atmosphere pressure into the intake pressure, thereby simplifying the structure of the plasma generating device P.

The plasma-generating air is intake air taken in from the air cleaner chamber 51 constituting an intake passage, and the plasma generator 60 and supply pipe 75 of the plasma generating device P are arranged along the air passage 52 constituting an intake passage. Thus, since the plasma-generating air is intake air, and the introduction pipe 70, the plasma generator 60, and the supply pipe 75 are arranged along the air passage 52, the introduction pipe 70, the plasma generator 60, and the supply pipe 75 can be arranged side by side with the intake device 40, thus allowing a compact arrangement of the plasma generating device P.

Since plasma contains radicals, adding plasma to intake air or an air-fuel mixture improves combustibility. However, the intake rate of intake air to be sucked into the combustion chamber 27 in accordance with the required load on the internal combustion engine varies greatly depending on the operational state of the internal combustion engine E. Thus, if the amount of generated plasma is not sufficient relative to the intake rate, it is difficult to fully exploit the combustibility improving effect due to plasma across a wide operating range of the internal combustion engine E. Further, there are also cases where the amount of plasma becomes excessive relative to the intake rate.

Accordingly, to control the amount of generated plasma, it may be possible to make the gas rate of plasma-generating gas introduced into the plasma generating device P constant, and control the discharge voltage for generating electrical discharge for converting the plasma-generating gas into a plasma state. In this case, however, the presence of plasma-generating gas not converted into plasma may make it difficult to adjust the air-fuel ratio (that is, the mixing ratio in an air-fuel mixture between fuel and air sucked into the combustion chamber 27) or ensure the uniformity of the mixing of the air-fuel mixture.

In a case where an intake pressure in the intake passage is used to introduce plasma-generating gas to the generating chamber 61, since the opening of the throttle valve 46 is small during low load operation of the internal combustion engine E, the intake pressure downstream of the throttle valve 46 becomes low (the negative pressure becomes large), so the gas rate of plasma-generating gas tends to become excessive. On the other hand, since the opening of the throttle valve 46 becomes large during a high load operation of the internal combustion engine E, and the intake pressure downstream of the throttle valve 46 becomes high (the negative pressure becomes small), the gas rate of plasma-generating gas becomes insufficient, so the combustibility improving effect due to plasma may not be fully attained.

To deal with this problem, the plasma generating device P of the internal combustion engine E includes the gas control valve 72 that increases the gas rate Mg of plasma-generating air when the intake rate Ma is controlled by the throttle valve 46 to increase. Since the generating amount of plasma to be generated can be thus controlled by the gas control valve 72 controlling the gas rate Mg of plasma-generating air introduced into the generating chamber so as to increase or decrease in accordance with an increase or decrease in the intake rate Ma of intake air due to the throttle valve 46, the gas rate Mg of plasma-generating air relative to the intake rate Ma can be set appropriately across a wide operating range of the internal combustion engine E in which the intake rate Ma varies. As a result, variations in the air-fuel ratio and a decrease in the uniformity of mixing of intake air and fuel resulting from the presence of plasma-generating air not converted into plasma can be suppressed while setting the amount of plasma supplied to the intake passage appropriate in accordance with the intake rate Ma. Thus, it is possible to enhance the combustibility improving effect due to plasma.

The plasma-generating air is an intake air upstream of the throttle valve 46, that is, an intake pressure within the air cleaner chamber 51. Since the gas control valve 72 operates in conjunction with the throttle valve 46, the gas control valve 72 controls the gas rate Mg of plasma-generating air in conjunction with the throttle valve 46, thereby suppressing variations in air-fuel ratio due to the gas rate Mg of plasma-generating air.

The intake device 40 includes the air cleaner 41 forming the air cleaner chamber 51 constituting an intake passage, the gas control valve 72 is arranged in the introduction passage 71 communicating between the clean chamber 51b of the air cleaner chamber 51 and the generating chamber 61, and the generating chamber 61 communicates with the downstream passage 52b in such a way that plasma is supplied to the downstream passage 52b that is a passage portion of the intake passage downstream of the throttle valve 46. Thus, air within the clean chamber 51b is introduced to the generating chamber 61 through the introduction passage 71 after having its flow rate controlled by the gas control valve 72. As a result, plasma-generating air can be taken in by using the air cleaner 41 of the intake device 40, so the structure of the plasma generating device P can be simplified. Moreover, the plasma generating device P can be arranged in close proximity to the intake device 40, thus allowing a compact arrangement of the intake device 40 and plasma generating device P.

Since plasma-generating air is taken in from within the air cleaner 41, even when generated plasma flows back into the introduction passage 71, after the backflowing plasma flows into the clean chamber 51b of the air cleaner chamber 51 through the introduction passage 71, the backflowing plasma flows toward the downstream side through the intake passage together with intake air and is sucked into the combustion chamber 27. As a result, by using the air cleaner 41 equipped to the intake device 40, leakage of backflowing plasma to the outside of the internal combustion engine E can be prevented by means of a simple structure.

Since the throttle valve 46 and the gas control valve 72 have the common valve shaft 47, 73, the valve shaft 47 of the throttle valve 46 can be used as the valve shaft 73 of the gas control valve 72, so the structure of the plasma generating device P can be simplified. Furthermore, the plasma generating device P can be arranged in close proximity to the throttle body 45 of the intake device 40, thus allowing a compact arrangement of the intake device 40 and plasma generating device P.

Since the ratio of the gas rate Mg of plasma-generating air to the intake rate Ma can be set to become larger as the opening of the throttle valve 46 becomes smaller, that is, as the engine load on the internal combustion engine E becomes smaller, in a low load operating range of the internal combustion engine E, the combustibility improving effect can be enhanced while maintaining the above-mentioned set air-fuel ratio. Moreover, since the gas rate Mg is larger than the intake rate Ma in the low load operation range, the combustibility improving effect can be further enhanced.

Hereinbelow, with regard to an embodiment in which the configuration according to the above-described embodiment is partially modified, a description will be given of the modified configuration.

As indicated by a two-dot chain line in FIG. 2, the plasma generator 60 of the plasma generating device P may be arranged in such a way that the center axis of the housing 62 crosses the intake passage. The introduction pipe 70, the gas control valve 72, and the supply pipe 75 in that case are indicated by a two-dot chain line.

The plasma-generating gas may be gas other than intake air.

As indicated by a two-dot chain line in FIG. 2, the power supply device 80 may be attached integrally with the plasma generator 60.

The anode 63 may be arranged within the guide passage 67, and the cathode 64 may be arranged so as to surround the anode 63.

The generating chamber 61 may be in communication with the intake passage by a passage (or a conduit) that is separate from the supply passage 76 (or the supply pipe 75), via an opening and closing valve provided in the passage (or the conduit). In the supply passage 76, there may be provided an opening and closing valve that controls the timing and duration at and for which plasma is supplied to the downstream passage 52b.

Other than being configured as a mechanism operated manually by the rider; the throttle operating mechanism may be a mechanism including an actuator such as an electric motor. Further, the throttle valve and the gas control valve may be operated by separate operating mechanisms.

The internal combustion engine may be a multi-cylinder internal combustion engine including an intake manifold as an intake pipe device, or may be a compression ignition type internal combustion engine in which intake throttling is performed.

The plasma generating device P of the internal combustion engine E includes the gas control valve 72 that increases the gas rate Mg of plasma-generating air when the intake rate Ma is controlled by the throttle valve 46 to increase. Since the generating amount of plasma to be generated can be thus controlled by the gas control valve 72 controlling the gas rate Mg of plasma-generating air introduced into the generating chamber so as to increase or decrease in accordance with an increase or decrease in the intake rate Ma of intake air due to the throttle valve 46, the gas rate Mg of plasma-generating air relative to the intake rate Ma can be set appropriately across a wide operating range of the internal combustion engine E in which the intake rate Ma varies. As a result, variations in air-fuel ratio and a decrease in the uniformity of mixing of intake air and fuel resulting from the presence of plasma-generating air not converted into plasma can be suppressed while setting the amount of plasma supplied to the intake passage appropriate in accordance with the intake rate Ma. Thus, it is possible to enhance the combustibility improving effect due to plasma.

It is known that when generating plasma by the plasma generating device P, the lower the generating-atmosphere pressure in the plasma generating device P the easier it is to generate plasma. Therefore, plasma generation efficiency can be improved if plasma can be generated at a pressure equivalent to a compression pressure within the combustion chamber 27 near the compression top dead center corresponding to the timing of the air-fuel mixture ignition or the timing immediately before ignition, or at a generating-atmosphere pressure lower than a generating-atmosphere pressure equal to or higher than the compression pressure. With an improvement in plasma generation efficiency, it is also possible to reduce the size, weight, and energy consumption of the plasma generating device.

To this end, in the plasma generating device P provided with the generating chamber 61 for generating plasma, the generating chamber 61 communicates with the intake passage, and the plasma generating device P supplies plasma to the downstream passage 52b between the throttle valve 46 and the intake valve 30 in the intake passage. Since the generating chamber 61 thus communicates with an intake passage where the intake pressure becomes a pressure lower than the compression pressure within the combustion chamber 27 near the compression top dead center, the generating-atmosphere pressure becomes substantially equal to the intake pressure. As a result, as compared with a case where the generating-atmosphere pressure is the above-mentioned compression pressure, the efficiency of plasma generation can be improved, thus making it possible to reduce the size and weight of the plasma generating device P. Furthermore, due to the low generating-atmosphere pressure, it is possible to reduce the consumption of power for generating plasma.

Further, due to plasma, intake air and fuel supplied from the fuel injection valve 56 are heated and raised in temperature, and the formation of an air-fuel mixture is facilitated. Therefore, also due to radicals contained in the plasma, the combustibility of the air-fuel mixture within the combustion chamber 27 is enhanced, thereby achieving enhanced engine output and improved fuel efficiency.

The plasma-generating air may be, other than intake air within the intake passage, air inside the internal combustion engine (for example, air stored in an air tank), or air outside of the internal combustion engine. Also, the plasma-generating air may be gas other than air, for example, an air-fuel mixture of fuel and air or exhaust gas.

The upstream end of the introduction pipe 70 may open to the upstream passage 52a so that the introduction passage 71 opens to the upstream passage 52a. Thus, the plasma-generating air may be intake air within the upstream passage 52a.

The internal combustion engine may be an engine that does not include the throttle valve. In that case, the intake control valve is the intake valve.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A plasma generator for use with an internal combustion engine comprising:
an intake device including a throttle valve arranged in an intake passage having an intake opening that opens to a combustion chamber;
an intake valve for opening and closing the intake opening; and
a plasma generating device having a generating chamber for converting plasma-generating gas into a plasma state to generate plasma;
wherein the generating chamber communicates with the intake passage; and
the plasma generating device supplies plasma via a supply pipe to a passage portion of the intake passage between the throttle valve and the intake valve, the supply pipe having:
one end which extends substantially parallel to an axial length of the passage portion of the intake passage and which is directly connected to the plasma generating device, and
an opposite end which extends substantially perpendicular to the passage portion and which is directly connected to a hole in a wall of the passage portion of the intake passage,
wherein the generating chamber includes an anode and a cathode operatively connected to a power supply for converting the plasma-generating gas into plasma,
wherein the cathode includes a distal end that is centrally disposed within the generating chamber to be coaxial with a guide pipe for supplying the plasma-generating gas, said cathode includes a proximal end disposed to be substantially surrounded by said anode.

2. The plasma generator for use with an internal combustion engine according to claim 1, wherein the supply pipe is connected to the plasma generator to introduce plasma to the passage portion and for communicating the passage portion with the generating chamber at all times.

3. The plasma generator for use with an internal combustion engine according to claim 2, wherein:
the plasma-generating gas is intake air that flows in the intake passage; and
the plasma generator and the supply pipe are arranged along the intake passage in a manner such that an axial length of the generating chamber and the axial length of the intake passage of the intake passage are substantially parallel to each other.

4. The plasma generator for use with an internal combustion engine according to claim 1, wherein the throttle valve is a butterfly valve operatively connected to a throttle operating mechanism selectively operated to open and close the butterfly valve.

5. The plasma generator for use with an internal combustion engine according to claim 1, and further including a control device operatively connected to a fuel injection valve for selectively supplying fuel to a side of the intake passage that is opposite to the side of the intake passage having the hole for supplying the plasma to the passage portion of the intake passage.

6. The plasma generator for use with an internal combustion engine according to claim 1,
wherein the anode is annular-shaped anode with a truncated-conical shaped inner surface facing a discharge space of the generating chamber.

7. The plasma generator for use with an internal combustion engine according to claim 6, and further including a gas control valve operatively positioned within the guide pipe for controlling the supply of plasma-generating gas supplied to the generating chamber.

8. The plasma generator for use with an internal combustion engine according to claim 7, wherein said gas control valve operates in conjunction with the throttle valve for opening and closing the supply of plasma-generating gas to the guide pipe in synchronization with the opening and closing of the throttle valve.

9. The plasma generator for use with an internal combustion engine according to claim 6, wherein the power supply applies a pulse voltage to the anode and cathode that is set to be substantially the same as a fuel injection timing and fuel injection duration.

10. A plasma generator for use with an internal combustion engine comprising:
an intake device including an intake control valve for controlling an intake rate of intake air sucked into a combustion chamber through an intake passage; and
a plasma generating device having a generating chamber for converting plasma-generating gas into a plasma state to generate plasma;
wherein the plasma generating device includes gas flow rate controlling means for controlling a gas flow rate of the plasma-generating gas in accordance with a required load, and supplies plasma to the intake passage, and
wherein the intake passage is substantially cylindrical in shape, and at a position downstream with respect to the intake control valve, a circumferential wall of the intake passage is provided with a hole through which the plasma is supplied to the intake passage,
wherein the generating chamber includes an anode and a cathode operatively connected to a power supply for converting the plasma-generating gas into plasma,
wherein the cathode includes a distal end that is centrally disposed within the generating chamber to be coaxial with a guide pipe for supplying the plasma-generating gas, said cathode includes a proximal end disposed to be substantially surrounded by said anode.

11. The plasma generator for use with an internal combustion engine according to claim 1, wherein:
the plasma-generating gas is plasma-generating air that is air outside of the internal combustion engine or the intake air upstream of the intake control valve;
the gas flow rate controlling means is formed by a gas control valve; and
the gas control valve operates in conjunction with the intake control valve.

12. The plasma generator for use with an internal combustion engine according to claim 11, wherein:
the intake device includes an air cleaner that forms an air cleaner chamber constituting the intake passage;
the gas control valve is arranged in an introduction passage that communicates between the air cleaner chamber and the generating chamber; and
the generating chamber communicates with a passage portion of the intake passage downstream of the intake control valve to supply the plasma to the passage portion, and
an axial length of the generating chamber and an axial length of the intake passage are substantially parallel to each other.

13. The plasma generator for use with an internal combustion engine according to claim 11, wherein the intake control valve and the gas control valve have a common valve shaft.

14. The plasma generator for use with an internal combustion engine according to claim 12, wherein the intake control valve and the gas control valve have a common valve shaft.

15. The plasma generator for use with an internal combustion engine according to claim 10,
wherein the anode is annular-shaped anode with a truncated-conical shaped inner surface facing a discharge space of the generating chamber.

16. The plasma generator for use with an internal combustion engine according to claim 15, wherein the gas flow rate control means is a gas control valve operatively positioned within the guide pipe for controlling the supply of plasma-generating gas supplied to the generating chamber.

17. The plasma generator for use with an internal combustion engine according to claim 16, wherein said gas control valve operates in conjunction with a throttle valve for opening and closing the supply of plasma-generating gas to the guide pipe in synchronization with the opening and closing of the throttle valve.

18. The plasma generator for use with an internal combustion engine according to claim 15, wherein the power supply applies a pulse voltage to the anode and cathode that is set to be substantially the same as a fuel injection timing and fuel injection duration.

* * * * *